INVENTOR.
WALTER BECKER
BY
Kurt Kelman
AGENT

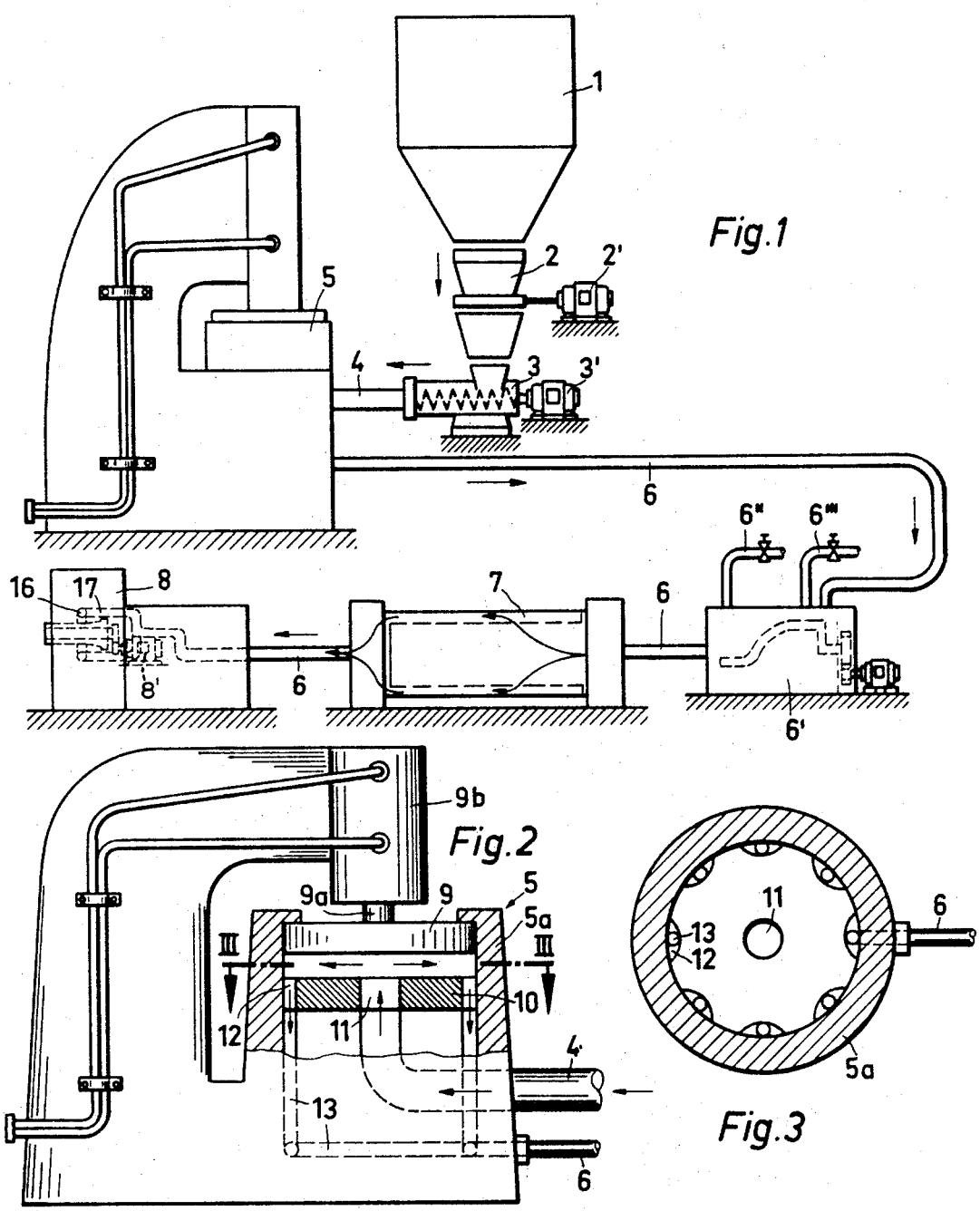

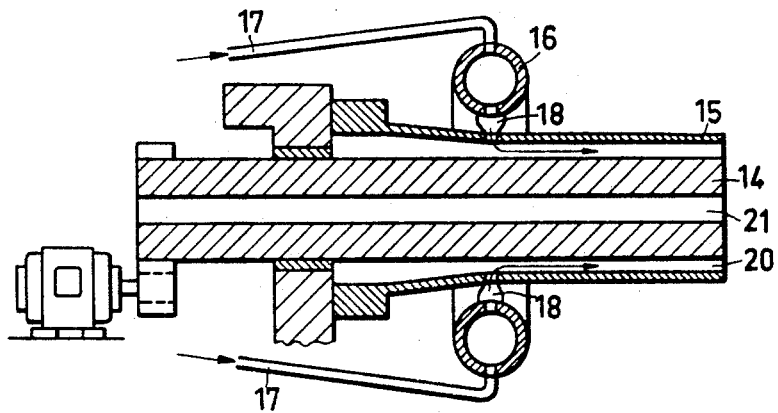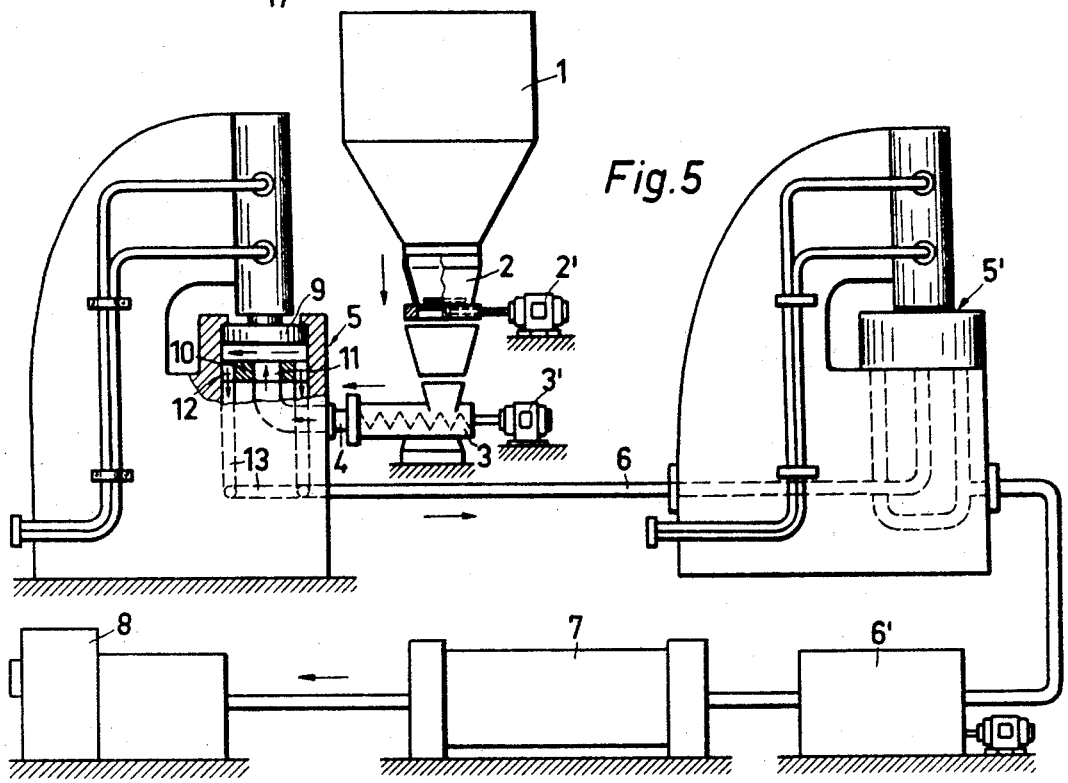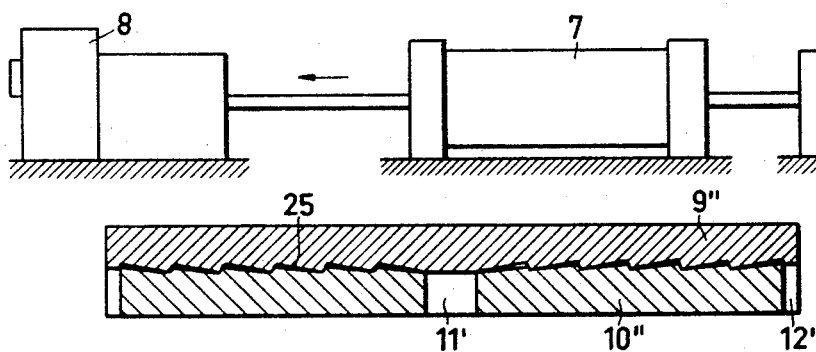

United States Patent Office 3,468,357
Patented Sept. 23, 1969

3,468,357
METHOD AND APPARATUS FOR MAKING ARTIFICIAL SAUSAGE CASINGS AND THE LIKE
Walter Becker, Uferstrasse 46, Heidelberg, Germany
Filed Jan. 3, 1966, Ser. No. 518,361
Claims priority, application Germany, Sept. 1, 1965, B 8,356
Int. Cl. B29d 23/04; B30b 9/02
U.S. Cl. 146—237        6 Claims

ABSTRACT OF THE DISCLOSURE

Artificial sausage casing is produced by extrusion of fibrous waste skin material from an apparatus in which the coarsely divided material in swelled condition is passed between pairs of parallel platens which move toward and away from each other to separate the fibers from each other before the latter are extruded through an annular shaping nozzle.

---

This invention relates to the manufacture of artificial sausage casings.

It is known to prepare artificial sausage casings from animal waste materials, such as animal skin waste. The waste material is limed, washed to remove lime and swelled by contact with acid aqueous solutions until its pH is approximately 3. The swelled material is cut into cubical pieces which are passed between fluted rolls so that the fibers are separated from each other. The mixture of fibers and aqueous liquid is converted into a homogeneous slurry or thin paste by means of a screw mixer. It contains about 10–12 percent solids, and may be extruded from an annular nozzle to form a tubular product which is suitable as an artificial sausage casing.

The most convenient source of skin waste are tanneries. The material cut from the flesh side of animal skins is available in large quantities at low cost. It is unavoidably contaminated with portions of the skins from the grain side whose properties are different from the connective tissue of which most of the waste consists. It is not possible to remove all the grain particles from the waste material prior to preparation of the fiber slurry. The skin portions from the grain side resist separation into fibers and form knots of rubber-like consistency which pass through the extrusion nozzle without breaking up.

When the tubular extrudate is subsequently dried, the grain particles shrink and separate from the remainder of the tube wall. The holes or pores formed thereby make the product useless for the intended purpose. If the grain particles are large enough, they may clog the extrusion nozzle.

In order to avoid the defects caused by knots of grain particles, it has been necessary heretofore to separate the knots from the remainder of the waste material before they reach the nozzle. It has been customary to arrange screens having very fine perforations in the conduits which lead the paste or slurry to the extrusion nozzle. The screens must be cleaned frequently and they cause a pressure drop in the feed conduit even when not partly obstructed by grain particles.

The maximum pressures available in suitable equipment practical weight and strength are approximately 6,000 to 7,500 p.s.i. If a significant part of this pressure is lost by passage through a screen in the conventional arrangements, the viscosity of the slurry must be kept low by holding the solids content below a limit which is between 10.5 and 11.5% depending on other process variables. The variations in process conditions caused by the build-up of particles on the screen makes continuous operation impractical, and the known process must be stopped from time to time for cleaning of the screen. The fluted rolls, moreover, have been found to shorten the fibers so that the product ultimately obtained does not have the mechanical strength that would be available from the fibers as originally received.

The object of the invention is a manufacture of artificial sausage casings and similar tubular products from animal waste, such as skin waste, which is free of the shortcomings of the known method described above.

The invention aims at the continuous processing of skin waste into sausage casings. It is a further object of the invention to permit the extrusion of fiber slurries containing more solids than is possible with the known method when using tannery waste as a raw material. More specifically, it is an object of the invention to convert skin waste, as it comes from the tannery, into an extrudable slurry without adding water so that the water content is substantially the same as that of the skin material, and the solids content about 13.5% or more, thereby reducing the time and the heat required for drying the extruded casings.

It has been found that cut and swelled pieces of animal skin waste consisting of many fibers are substantially separated into individual fibers when they are subjected to pressure between approximately parallel walls which move toward each other. Not only connective tissue but also grain material is separated into fibers or into loosely connected bundles of fibers which disintegrate during further processing, and not later than in the extrusion nozzle. When a particularly narrow nozzle is to be employed for making very thin casings, it is preferred to use two or more pressure stages in series, or partly in series and partly in parallel, to achieve complete disintegration even of grain particles into individual fibers ahead of the extrusion nozzle.

The fibrous animal skin material is initially contacted with an aqueous liquid until the material is swelled, and coarsely dividing the material into pieces of each which includes a multiplicity of fibers. The divided swelled material is then passed according to the invention between two parallel walls while the walls are moved toward each other transversely of the movement of the material and thereby exert pressure on the passing material from which individual fibers are separated, the entire piece disintegrating into individual fibers under optimum conditions. The fibers are then extruded from a nozzle.

When the material is passed between more than one pairs of walls, the walls further downstream in the direction of flow of the fibrous material are moved closer toward each other than the walls of pairs further upstream before they are moved apart again. The minimum width of the gaps passed by the material between successive pairs of walls thus decreases.

The apparatus used for continuous conversion of swelled, coarsely divided fibrous animal skin material comprises a press in which two platens having opposite, approximately parallel faces are arranged in a common casing. The platen faces are moved toward and away from each other so that a chamber in the press casing expands and contracts. The material to be processed is fed to the chamber under pressure and is discharged from the chamber through a conduit and an annular shaping nozzle in the form of a tube.

The nozzle essentially may consist of two die members which define an annular gap therebetween. Passages through one of the die members communicate with the gap and with an annular distributor tube, and taper in a direction from the tube toward the gap.

The face of one of the platens is preferably formed with a central aperture through which the raw material enters the press chamber, and discharge orifices are spaced from the aperture in respective directions substantially parallel to the platen faces and angularly offset relative to each other. The discharge orifices connect the chamber with the aforementioned conduit.

Other features, additional objects and many of the attendant advantages of this invention will be readily appreciated as the same becomes better understood by reference to the following detailed description when considered in connection with the accompanying drawing wherein:

FIG. 1 shows preferred apparatus in side elevation, and partly in section;

FIG. 2 shows a detail of the apparatus of FIG. 1 on an enlarged scale and partly in section;

FIG. 3 shows the device of FIG. 2 in fragmentary section on the line III—III;

FIG. 4 illustrates another detail of the apparatus of FIG. 1 in elevational section on a larger scale;

FIG. 5 shows a modification of the apparatus of FIG. 1;

FIG. 6 shows a modified detail of the device of FIG. 2 in greatly enlarged elevational section;

Figure 7:
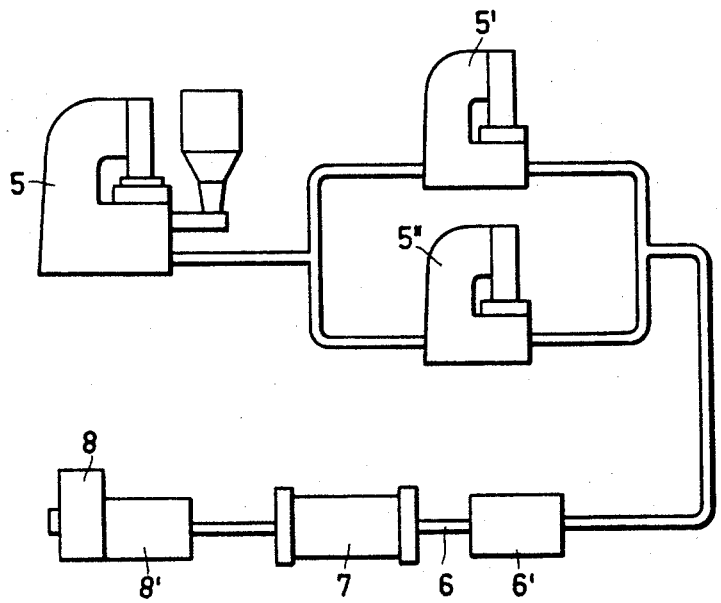
FIG. 7 shows another modification of the apparatus of FIG. 1 in elevation on a smaller scale.

Referring now to the drawing in detail, and initially to FIG. 1, there is seen a bin 1 from which animal skin waste, limed, washed and swelled in the usual manner, is discharged into a slicer 2 driven by an electric motor 2'. The strips of skin waste discharged from the slicer drop into a screw feeder 3 driven by a motor 3'. The discharge conduit 4 of the feeder 3 is connected to a press 5 seen in more detail in FIG. 2.

The press includes a cylindrical upright casing 5a in which a movable platen 9 is mounted on the piston rod 9a of a hydraulic cylinder 9b which is a fixed part of the press 5. The hydraulic circuit of the cylinder 9b has not been illustrated since it may be entirely conventional and include a positive displacement pump, a control valve connected to the pump and the cylinder for raising and lowering the non-illustrated piston attached to the rod 9a, a sump for hydraulic fluid, and the necessary piping.

The bottom of the casing 5a is constituted by a fixed platen 10 formed with a central aperture 11 and with peripheral orifices 12 of discharge conduits 13 which are angularly uniformly distributed about the central aperture 11, as best seen in FIG. 3. The several discharge conduits 13 are connected with a common pressure conduit 6. Reverting to FIG. 1, it is seen that the conduit 6 leads from the press 5 to an extrusion device 8 which includes the nozzle partly shown in greater detail in FIG. 4 and a drive motor 8'.

The annular extrusion gap 20 is formed by a tubular stationary outer die 15 and by an inner die 14, also tubular and provided with a central bore 21 for inflating the extrudate in a known manner, not shown in detail. The inner die 14 is normally rotated during extrusion by the motor 8', not shown in FIG. 4. The outer die 15 is coaxially surrounded by a distributor tube 16 of toroidal shape. Circumferentially distributed supply conduits 17 connect the tube 16 to the pressure conduit 6, and circumferentially distributed radial passages in the outer die 15 are connected with the distributor tube 16 by short nipples 18 which taper in a radially inward direction.

FIG. 1 also shows a mixing vessel 6' and a tubular filter housing 7 which are parts of the pressure conduit 6. Pipes 6" and 6''' permit addition agents, such as tanning agents, or water to be admixed to the material discharged from the press 5, and coarse screen material in the housing 7 retains accidental contaminants which might damage the extrusion nozzle without causing a significant pressure drop.

The modified apparatus illustrated in FIG. 5 has two presses 5, 5' substantially identical with the press 5 shown in FIGS. 1 and 2 arranged in series, and FIG. 7 shows a modified apparatus of the invention in which three presses 5, 5', 5" are arranged for flow of the raw material first through the press 5, and thereafter in two parallel streams through the presses 5', 5" whose output is jointly fed to the mixer 6' in an arrangement otherwise analogous to those of FIGS. 1 or 5. When two or more presses are arranged in series, the strokes of their movable platens or the positions of their fixed platens are arranged in such a manner that the movable platen approaches the fixed platen more closely in each successive press in the direction of waste material flow. It is not necessary, nor even desirable that the platens fully engage each other.

The screw feeder 3 provides an effective check valve which prevents flow of material in a direction from the extrusion device 8 toward the bin 1, and the pressure exerted by the movable platen 9 may therefore be relied upon for forcing the fiber slurry through the nozzle shown in FIG. 4. It will be appreciated, however, that feeders or pumps may be installed anywhere in the pressure conduit 6 to expedite the flow of the slurry and a convention extrusion screw may be incorporated in the device 8. An auxiliary pump may also readily be incorporated in the press as shown in FIG. 8.

Figure 8:
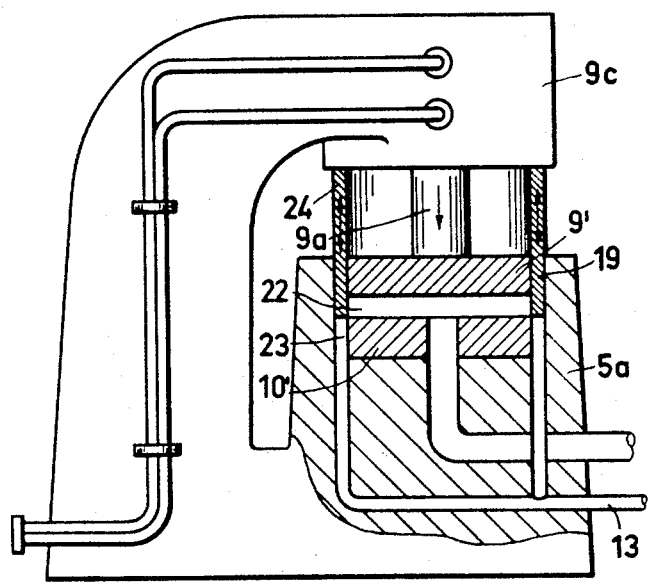
FIG. 8 shows yet another modification of the device of FIG. 2.

The fixed platen 10' and the movable platen 9' of the press shown in FIG. 8 are smaller in diameter than the inner wall of the casing 5a so that the pressure chamber 22 axially defined between the platens, and the platens themselves, are enveloped by a pumping space 23 of annular cross section. A tubular plunger 19 coaxial with the platen 9' and the piston rod 9a is axially slidable in the pumping space 23 between the illustrated position in which a portion of the plunger is axially coextensive with the pressure chamber 22 and thereby radially seals the pressure chamber, and a non-illustrated position in which the plunger 9' is lifted so as to permit flow between the pressure chamber 22 and the discharge conduits 13 whose orifices are located at the bottom of the pumping space 23.

The press shown in FIG. 8 is equipped with a hydraulic cylinder 9c having a central cylindrical chamber and a peripheral chamber of annular section. The two chambers accommodate respective conforming pistons in a manner not shown in FIG. 8 connected to the platen 9 and the plunger 19 by respective piston rods 9a and 24. The non-illustrated control valves of the cylinder 9c are arranged in such a manner that the platen 9' moves upward when the plunger 19 moves downward, and vice versa. The platen 9' draws material into the pressure chamber 22 while previously disintegrated material is discharged through the conduits 13 by the plunger 19. While material is being transferred from the chamber 22 to the space 23 by the descending platen 9', and is disintegrated in the process, the plunger 19 is lifted to open the pumping space 23.

The several presses illustrated may be provided with platens 9", 10" whose opposite faces have circular corrugations 25 which are saw-tooth-shaped when viewed in axial section, as shown in FIG. 6. The corrugations of the lower platen 10" have a gentle slope toward the central aperture 11', and slope more steeply toward the periphery. Such corrugations tend to retain larger fiber aggregates, such as knots of grain material, in the pressure chamber of the press until they are disintegrated.

The several embodiments of the invention operate basically in the same manner. The sliced skin waste fed by the screw feeder 3 to the central aperture 11, 11' in the stationary platen 10, 10', 10" of a press of the invention is spread apart as it flows along the face of the stationary platen toward the periphery, and is flattened by the pressure exerted by the platens as they are moved toward each other. The material forced by the press into the conduit 6 largely or substantially entirely consists of individual fibers and fiber bundles so loosely associated that they disintegrate in the conduit or in the extrusion device.

The disintegration is enhanced by series arrangement of several presses as shown in FIGS. 5 and 7, particularly if the minimum gap between the platens decreases in successive presses. A more rapid decrease in gap width without undue pressure drop is possible when two presses are arranged in parallel behind a preceding press, as shown in FIG. 7.

While hydraulic cylinders have been shown in the several presses of the invention, the presses may be actuated by eccentrics or in any other known manner without mateerially affecting the mode of operation. Although material is discharged from the extrusion device 8 of the apparatus shown in FIG. 1 at a rate which varies cyclically with the reciprocating movement of the platen 9, the apparatus operates continuously, and requires but a minimum of labor. The extrudate discharged from the extrusion device 8 is dried and further processed in a conventional manner not requiring more detailed discussion, and the known final steps of casing manufacture are readily made continuous. Continuous operation is similarly inherent in the other illustrated devices. Because of the disintegration of all types of waste skin tissue in the press or presses provided, long periods of uninterrupted operation are normally possible.

While the invention has been described with particular reference to specific embodiments, it is to be understood that it is not limited thereto.

What is claimed is:

1. A press for disintegrating small pieces of animal skin waste material, which has been limed, washed and swollen, into individual fibers in the preparation of the material for extrusion into sausage casings and the like, comprising:
    (a) a casing defining an inner wall about an axis;
    (b) two platens in said casing, the platens having opposite, substantially parallel faces defining a chamber extending transversely of the casing axis;
    (c) an inlet for the small pieces of animal skin waste material in one of the platens;
    (d) actuating means for axially moving at least one of the platens whereby the transverse chamber is expanded and contracted, contraction of the chamber causing disintegration of the material and movement of the material from the inlet through the transverse chamber towards the inner wall of the casing; and
    (e) discharge means for the disintegrated material spaced from the inlet adjacent the inner casing wall.

2. The press of claim 1, wherein the actuating means is arranged to move one of the platens and the other platen is stationary, and the inlet is a central aperture in the stationary platen extending along the axis of the casing.

3. The press of claim 2, wherein the opposite faces of the platens have saw-tooth-shaped circular corrugations interlocking with each other when the faces are moved together.

4. The press of claim 2, wherein the discharge means for the disintegrated material includes a plurality of discharge orifices in the stationary platen circumferentially spaced about the central aperture.

5. The press of claim 2, wherein the discharge means for the disintegrated material includes an annular discharge orifice defined between the inner casing wall and the stationary platen, and further comprising a tubular plunger arranged for axial movement in an annular space defined between the inner casing wall and the movable platen, the tubular plunger being movable toward and away from a position in which the plunger seals communication between the transverse chamber and the annular discharge orifice.

6. A method for disintegrating small pieces of animal skin waste material, which has been limed, washed and swollen, into individual fibers in the preparation of the material for extrusion into sausage casings and the like, the steps of passing the small pieces of animal skin waste material in one direction into a chamber defined between opposite, substantially parallel faces of two platens, moving said faces together in said direction whereby disintegrating pressure is exerted upon the material in the chamber and the material is simultaneously moved in said chamber transversely of said direction, and discharging the disintegrated material from the chamber after it has been transversely moved.

References Cited

UNITED STATES PATENTS

| | | | |
|---|---|---|---|
| 2,161,908 | 6/1939 | Becker | 18—14 X |
| 2,345,086 | 3/1944 | Becker et al. | 18—14 |
| 2,366,417 | 1/1945 | Mac Millin | 18—12 X |
| 2,598,913 | 6/1952 | Hjulian | 18—12 XR |
| 2,748,933 | 6/1956 | Deutsch. | |
| 2,896,254 | 7/1959 | Braun | 18—14 |
| 2,948,920 | 8/1960 | Hausman | 18—12 X |
| 3,137,034 | 6/1964 | Adams | 18—12 X |

MARION PARSONS, Jr., Primary Examiner

U.S. Cl. X.R.

18—2, 14; 146—1, 239